(12) United States Patent
Huggahalli et al.

(10) Patent No.: US 8,001,278 B2
(45) Date of Patent: Aug. 16, 2011

(54) NETWORK PACKET PAYLOAD COMPRESSION

(75) Inventors: Ramakrishna Huggahalli, Mesa, AZ (US); Steen K. Larsen, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 232 days.

(21) Appl. No.: 11/906,162

(22) Filed: Sep. 28, 2007

(65) Prior Publication Data

US 2009/0089454 A1 Apr. 2, 2009

(51) Int. Cl.
*G06F 15/16* (2006.01)
(52) U.S. Cl. ........ 709/247; 709/203; 709/205; 370/352; 370/429
(58) Field of Classification Search ................... 709/204, 709/214, 231, 238, 247, 250, 203; 370/202, 370/351–359, 412, 463, 465, 474, 392–394, 370/912; 710/52, 68
See application file for complete search history.

(56) References Cited

U.S. PATENT DOCUMENTS

| | | | |
|---|---|---|---|
| 6,608,841 B1* | 8/2003 | Koodli | 370/474 |
| 6,625,671 B1* | 9/2003 | Collette et al. | 710/52 |
| 6,751,209 B1* | 6/2004 | Hamiti et al. | 370/349 |
| 7,496,586 B1* | 2/2009 | Bonwick et al. | 707/101 |
| 7,529,845 B2* | 5/2009 | Liu | 709/230 |
| 2002/0095513 A1* | 7/2002 | Lin et al. | 709/238 |
| 2002/0099858 A1* | 7/2002 | Lindo et al. | 709/250 |
| 2002/0126675 A1* | 9/2002 | Yoshimura et al. | 370/395.21 |
| 2003/0028673 A1* | 2/2003 | Lin et al. | 709/247 |
| 2004/0076150 A1* | 4/2004 | Miao | 370/389 |
| 2004/0090989 A1* | 5/2004 | Kobayashi | 370/469 |
| 2004/0218601 A1* | 11/2004 | Fleming | 370/389 |
| 2005/0280841 A1* | 12/2005 | Bossut et al. | 358/1.2 |
| 2006/0104303 A1* | 5/2006 | Makineni et al. | 370/463 |
| 2007/0014332 A1* | 1/2007 | Santhoff et al. | 375/130 |
| 2007/0050515 A1* | 3/2007 | Fallon | 709/231 |
| 2007/0064737 A1* | 3/2007 | Williams | 370/473 |
| 2007/0067483 A1* | 3/2007 | Fallon | 709/231 |
| 2007/0115964 A1* | 5/2007 | Srinivasan et al. | 370/389 |
| 2007/0143398 A1* | 6/2007 | Graham | 709/204 |
| 2007/0239897 A1* | 10/2007 | Rothman et al. | 709/247 |
| 2007/0277036 A1* | 11/2007 | Chamberlain et al. | 713/171 |
| 2008/0089357 A1* | 4/2008 | Park et al. | 370/465 |
| 2008/0172563 A1* | 7/2008 | Stokes | 713/193 |
| 2008/0229147 A1* | 9/2008 | Earhart et al. | 714/15 |
| 2008/0301256 A1* | 12/2008 | McWilliams et al. | 709/214 |
| 2008/0313371 A1* | 12/2008 | Kedem et al. | 710/68 |
| 2009/0022171 A1* | 1/2009 | Chen et al. | 370/412 |

OTHER PUBLICATIONS

Tremaine, et al., "IBM Memory Expansion Technology (MXT)", IBM J. Res. & Dev. vol. 45 No. 2, Mar. 2001. pp. 271-285.

* cited by examiner

*Primary Examiner* — Wing F Chan
*Assistant Examiner* — Tesfay Yohannes
(74) *Attorney, Agent, or Firm* — Caven & Aghevli LLC

(57) ABSTRACT

Methods and apparatus relating to network packet payload compression/decompression are described. In an embodiment, an uncompressed packet payload may be compressed before being transferred between various components of a computing system. For example, a packet payload may be compressed prior to transfer between network interface cards or controllers (NICs) and storage devices (e.g., including a main system memory and/or cache(s)), as well as between processors (or processor cores) and storage devices (e.g., including main system memory and/or caches). Other embodiments are also disclosed.

19 Claims, 4 Drawing Sheets

NETWORK PACKET PAYLOAD COMPRESSION

BACKGROUND

The present disclosure generally relates to the field of electronics. More particularly, an embodiment of the invention generally relates to network packet payload compression and/or decompression.

Networking has become an integral part of computing. With each successive generation, networks become capable of communicating larger amounts of data. As the size of data communicated over a network increases, however, the demand on components of a computing device that move these larger amounts of data also increases. For example, in a 10 Gbit Ethernet network, the rate at which data is moved to/from the network can reach 10 Gb/s or 1.25 GB/s (minus some packet header and Ethernet overheads). These increasing loads may result in an increase of latency, bandwidth requirements, power consumption, implementation costs, etc.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures may indicate similar items.

DETAILED DESCRIPTION

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

Some embodiments discussed herein may compress certain portions of data (e.g., packet payloads) transferred between Network Interface Controllers (NICs) and storage device(s) (e.g., including a main system memory and/or cache(s)), as well as between processors (or processor cores) and storage device(s) (e.g., including a main system memory and/or cache(s)). Such techniques may reduce bandwidth utilization, power consumption, cost (e.g., associated with more complex/costly system designs that would be needed otherwise), and/or latency, for example, from the perspective of the processor cores and NICs, which may in turn improve overall platform performance and/or efficiency.

Figure 1:
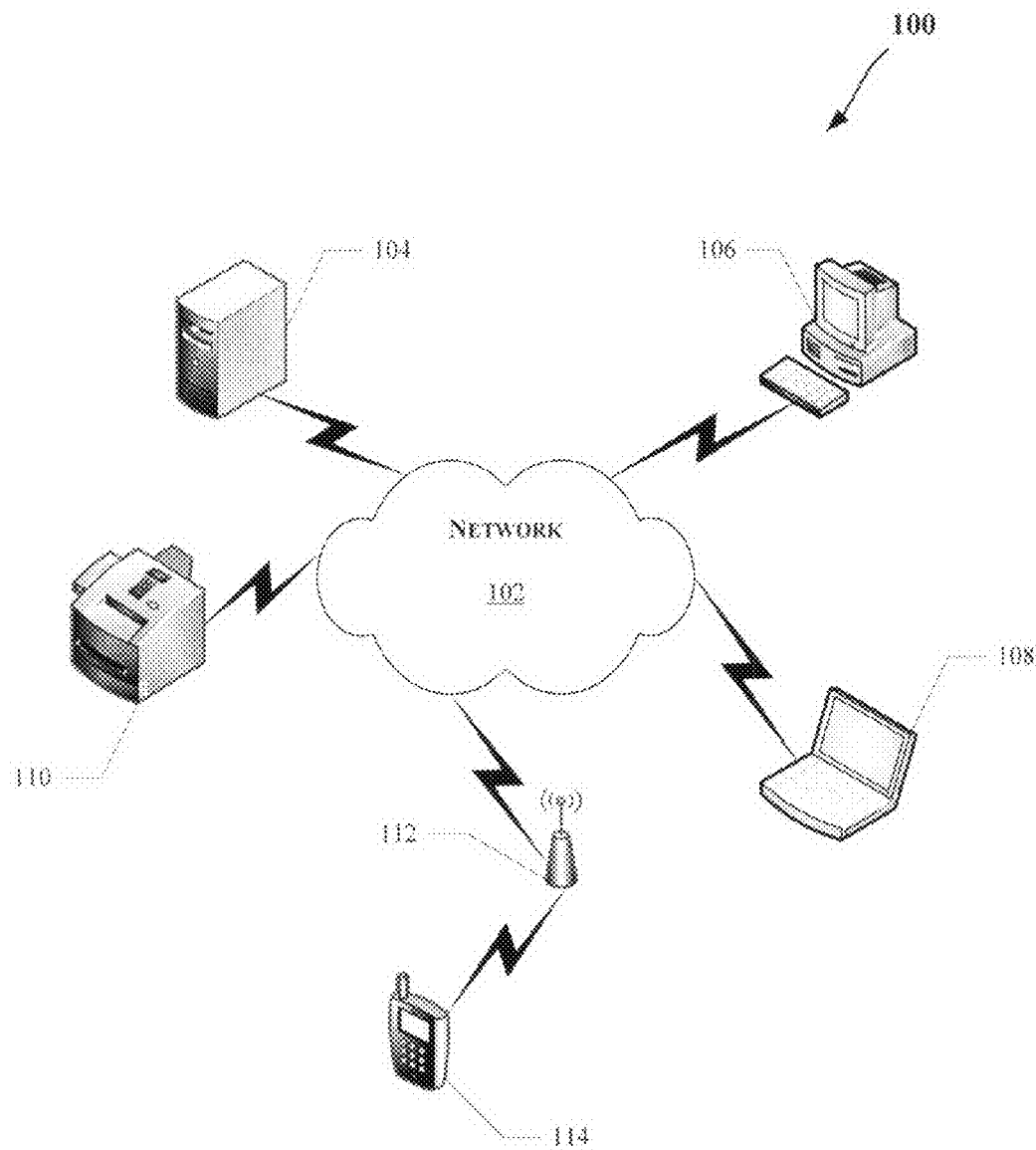
FIG. 1 illustrates various components of an embodiment of a networking environment, which may be utilized to implement various embodiments discussed herein.

FIG. 1 illustrates various components of an embodiment of a networking environment 100, which may be utilized to implement various embodiments discussed herein. The environment 100 may include a network 102 to enable communication between various devices such as a server computer 104, a desktop computer 106 (e.g., a workstation or a desktop computer), a laptop (or notebook) computer 108, a reproduction device 110 (e.g., a network printer, copier, facsimile, scanner, all-in-one device, etc.), a wireless access point 112, a personal digital assistant or smart phone 114, a rack-mounted computing system (not shown), etc. The network 102 may be any type of a computer network including an intranet, the Internet, and/or combinations thereof.

The devices 104-114 may be coupled to the network 102 through wired and/or wireless connections. Hence, the network 102 may be a wired and/or wireless network. For example, as illustrated in FIG. 1, the wireless access point 112 may be coupled to the network 102 to enable other wireless-capable devices (such as the device 114) to communicate with the network 102. In one embodiment, the wireless access point 112 may include traffic management capabilities. Also, data communicated between the devices 104-114 may be encrypted (or cryptographically secured), e.g., to limit unauthorized access.

The network 102 may utilize any type of communication protocol such as Ethernet, Fast Ethernet, Gigabit Ethernet, wide-area network (WAN), fiber distributed data interface (FDDI), Token Ring, leased line, analog modem, digital subscriber line (DSL and its varieties such as high bit-rate DSL (HDSL), integrated services digital network DSL (IDSL), etc.), asynchronous transfer mode (ATM), cable modem, and/or FIREWIRE interface.

Wireless communication through the network 102 may be in accordance with one or more of the following: wireless local area network (WLAN), wireless wide area network (WWAN), code division multiple access (CDMA) cellular radiotelephone communication systems, global system for mobile communications (GSM) cellular radiotelephone systems, North American Digital Cellular (NADC) cellular radiotelephone systems, time division multiple access (TDMA) systems, extended TDMA (E-TDMA) cellular radiotelephone systems, third generation partnership project (3G) systems such as wide-band CDMA (WCDMA), etc. Moreover, network communication may be established by internal network interface devices (e.g., present within the same physical enclosure as a computing system) or external network interface devices (e.g., having a separate physical enclosure and/or power supply than the computing system to which it is coupled) such as a network interface controller (NIC).

Figure 2:
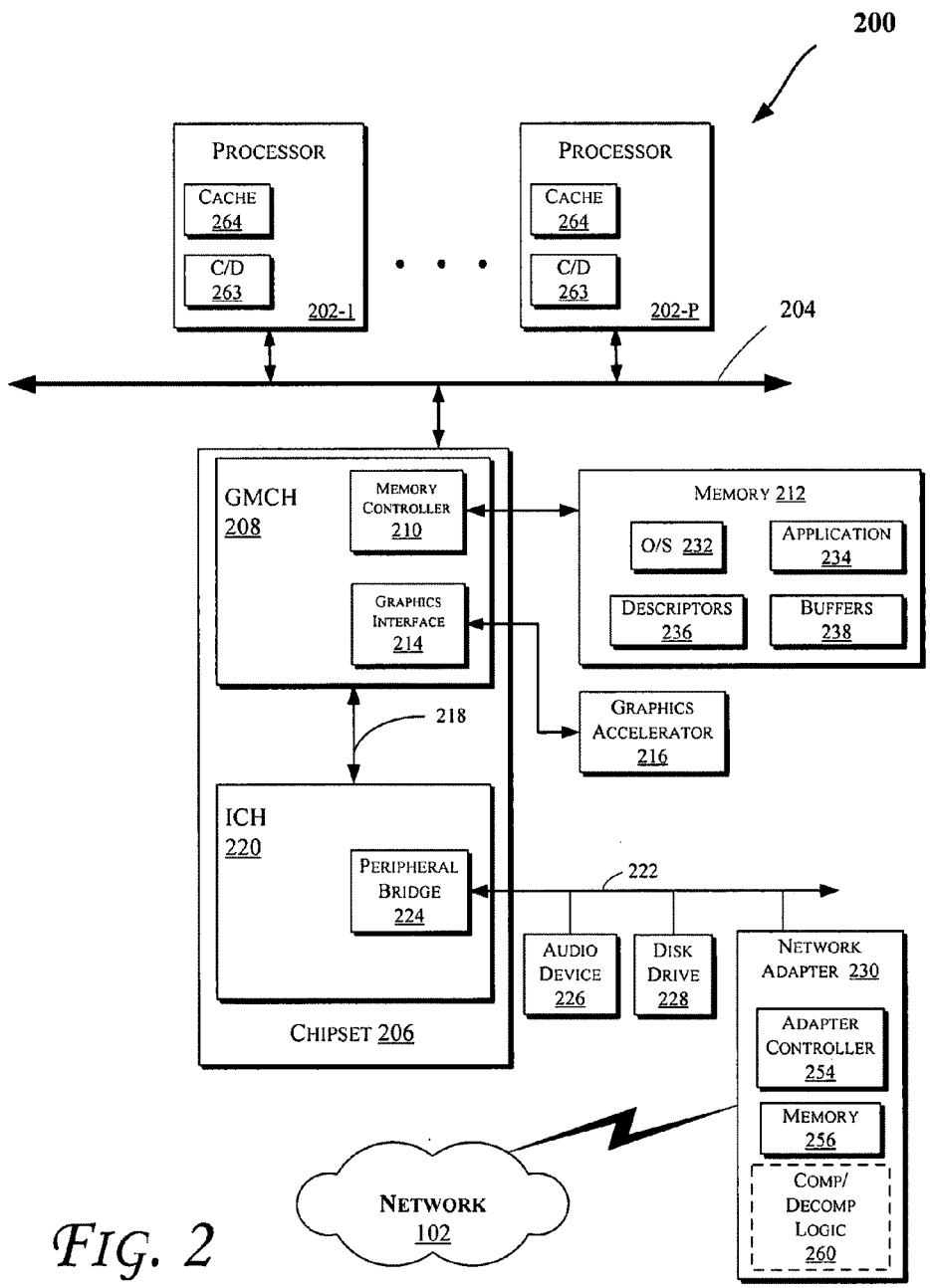
FIGS. 2 and 5 illustrate block diagrams of embodiments of computing systems, which may be utilized to implement some embodiments discussed herein.

FIG. 2 illustrates a block diagram of a computing system 200 in accordance with an embodiment of the invention. The computing system 200 may include one or more central processing unit(s) (CPUs) or processors 202-1 through 202-P (which may be referred to herein as "processors 202" or "processor 202"). The processors 202 may communicate via an interconnection network (or bus) 204. The processors 202 may include a general purpose processor, a network processor (that processes data communicated over the computer network 102), or other types of a processor (including a reduced instruction set computer (RISC) processor or a complex instruction set computer (CISC)). Moreover, the processors 202 may have a single or multiple core design. The processors 202 with a multiple core design may integrate different types of processor cores on the same integrated circuit (IC) die.

Also, the processors 202 with a multiple core design may be implemented as symmetrical or asymmetrical multiprocessors. In an embodiment, various operations discussed herein may be performed by one or more components of the system 200.

A chipset 206 may also communicate with the interconnection network 204. The chipset 206 may include a graphics memory control hub (GMCH) 208. The GMCH 208 may include a memory controller 210 that communicates with a memory 212. The memory 212 may store data, including sequences of instructions that are executed by the processor 202, or any other device included in the computing system 200. In one embodiment of the invention, the memory 212 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 204, such as multiple CPUs and/or multiple system memories.

The GMCH 208 may also include a graphics interface 214 that communicates with a graphics accelerator 216. In one embodiment of the invention, the graphics interface 214 may communicate with the graphics accelerator 216 via an accelerated graphics port (AGP). In an embodiment of the invention, a display (such as a flat panel display, a cathode ray tube (CRT), a projection screen, etc.) may communicate with the graphics interface 214 through, for example, a signal converter that translates a digital representation of an image stored in a storage device such as video memory or system memory into display signals that are interpreted and displayed by the display. The display signals produced by the display device may pass through various control devices before being interpreted by and subsequently displayed on the display.

A hub interface 218 may allow the GMCH 208 and an input/output control hub (ICH) 220 to communicate. The ICH 220 may provide an interface to I/O devices that communicate with the computing system 200. The ICH 220 may communicate with a bus 222 through a peripheral bridge (or controller) 224, such as a peripheral component interconnect (PCI) bridge, a universal serial bus (USB) controller, or other types of peripheral bridges or controllers. The bridge 224 may provide a data path between the processor 202 and peripheral devices. Other types of topologies may be utilized. Also, multiple buses may communicate with the ICH 220, e.g., through multiple bridges or controllers. Moreover, other peripherals in communication with the ICH 220 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 222 may communicate with an audio device 226, one or more disk drive(s) 228, and one or more network interface device(s) 230 (which is in communication with the computer network 102 and may comply with one or more of the various types of communication protocols discussed with reference to FIG. 1). In an embodiment, the network interface device 230 may be a NIC. Other devices may communicate via the bus 222. Also, various components (such as the network interface device 230) may communicate with the GMCH 208 in some embodiments of the invention. In addition, the processor 202 and the GMCH 208 may be combined to form a single chip. Furthermore, the graphics accelerator 216 may be included within the GMCH 208 in other embodiments of the invention.

Furthermore, the computing system 200 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 228), a floppy disk, a compact disk ROM (CD-ROM), a digital versatile disk (DVD), flash memory, a magneto-optical disk, or other types of nonvolatile machine-readable media that are capable of storing electronic data (e.g., including instructions). In an embodiment, components of the system 200 may be arranged in a point-to-point (PtP) configuration. For example, processors, memory, and/or input/output devices may be interconnected by a number of point-to-point interfaces, such as discussed with reference to FIG. 5.

As illustrated in FIG. 2, the memory 212 may include one or more of an operating system(s) (O/S) 232 or application(s) 234. The memory 212 may also store one or more device driver(s), packet buffers 238, descriptors 236 (which may point to the buffers 238 in some embodiments), protocol driver(s), etc. to facilitate communication over the network 102. Programs and/or data in the memory 212 may be swapped into the disk drive 228 as part of memory management operations. The application(s) 234 may execute (on the processor(s) 202) to communicate one or more packets with one or more computing devices coupled to the network 102 (such as the devices 104-114 of FIG. 1). In an embodiment, a packet may be a sequence of one or more symbols and/or values that may be encoded by one or more electrical signals transmitted from at least one sender to at least on receiver (e.g., over a network such as the network 102). For example, each packet may include a header that includes various information, which may be utilized in routing and/or processing the packet, such as a source address, a destination address, packet type, etc. Each packet may also have a payload that includes the raw data (or content) the packet is transferring between various computing devices (e.g., the devices 104-114 of FIG. 1) over a computer network (such as the network 102).

In an embodiment, the application 234 may utilize the O/S 232 to communicate with various components of the system 200, e.g., through a device driver (not shown). Hence, the device driver may include network adapter 230 specific commands to provide a communication interface between the O/S 232 and the network adapter 230. Furthermore, in some embodiments, the network adapter 230 may include a (network) protocol layer for implementing the physical communication layer to send and receive network packets to and from remote devices over the network 102. The network 102 may include any type of computer network such as those discussed with reference to FIG. 1. The network adapter 230 may further include a DMA engine, which may write packets to buffers 238 assigned to available descriptors 236 in the memory 212. Additionally, the network adapter 230 may include a network adapter controller 254, which may include hardware (e.g., logic circuitry) and/or a programmable processor (such as the processors 202) to perform adapter related operations. In an embodiment, the adapter controller 254 may be a MAC (media access control) component. The network adapter 230 may further include a memory 256, such as any type of volatile/nonvolatile memory, and may include one or more cache(s).

As shown in FIG. 2, the network adapter 230 may include a compression/decompression logic 260 (which may be implemented as hardware, software, or some combination thereof) to compress and/or decompress the payload of packets received from the network 102 or transmitted to the network 102, respectively. In one embodiment, logic 260 may be optional and the adapter controller 254 performs compression and/or decompression on the payloads.

Also, one or more of the processors 202 may include compression/decompression logic to 263, e.g., to allow the processors 202 to compress and/or decompress packet payloads prior to storing the compressed payloads in a storage device, such as the memory 212 (e.g., within the buffers 238) and/or a cache 264. For example, a compressed payload stored in the memory 212 (e.g., by the network adapter 230) may be decompressed by the logic 263 prior to storage in one of the caches 264 in one embodiment. Also, a decompressed payload stored in the cache 264 (e.g., decompressed by the logic 263) may be compressed by the logic 263 prior to storing it in the memory 212 (e.g., within the buffers 238) and subsequently decompressed by the network adapter 230 prior to transmission over the network 102. Alternatively, rather than a separate logic 263, the processors 202 may compress/decompress data in accordance with instructions (e.g., stored in a storage device such as the memory 212 and/or cache 264).

Furthermore, the cache 264 may be a shared or private cache. The cache 264 may include various levels such as one or more of a level 1 (L1) cache, a level 2 (L2) cache, a mid-level cache (MLC), or a last level cache (LLC). Additionally, the cache 264 may be provided in locations other than or in addition to those shown in FIG. 2. For example, the cache 264 may be coupled to the bus 204 in some embodiments.

Figure 3:
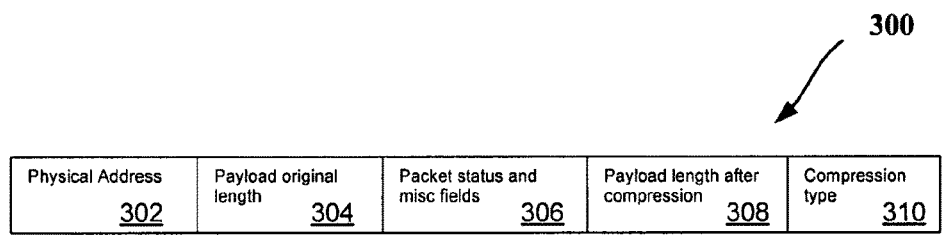
FIG. 3 illustrates a descriptor format in accordance with an embodiment.

FIG. 3 illustrates a descriptor format 300, according to an embodiment. In some embodiments, one or more of the descriptors 236 may have the format illustrated in FIG. 3. As shown, the descriptor 300 may include a physical address field 302 (e.g., to indicate a physical address of the corresponding payload data stored in a storage device), a payload original length field 304 (e.g., to indicate the original payload length, for example, prior to compression), packet status and miscellaneous fields 306 (e.g., to indicate the status of the corresponding packet and other information), a payload length after compression field 308 (e.g., to indicate the length of the payload after compression) and a compression type filed 310 (e.g., to indicate the type of compression utilized).

Generally, any type of compression may be used to compress payloads. For example, there are a variety of compression methods such as Lempel-Ziv that may compress packet payloads to a smaller size based on the dictionary construction or trivial compression if the payload contains highly repetitive patterns. The amount of compression is dependent on the repetition of patterns within the packet. Embodiments described herein do not preclude implementation of any form of compression or multiple methods of compression which may be applied to packet payloads containing different types of data. An implementation may compress payload using two or more different methods of compression and select a method that results in better compressibility. In one embodiment, IBM®'s MXT compression may be used. Methods that focus on small blocks (a small multiple of a cache line such as 128 to 512-byte blocks) may also be used.

Figure 4:
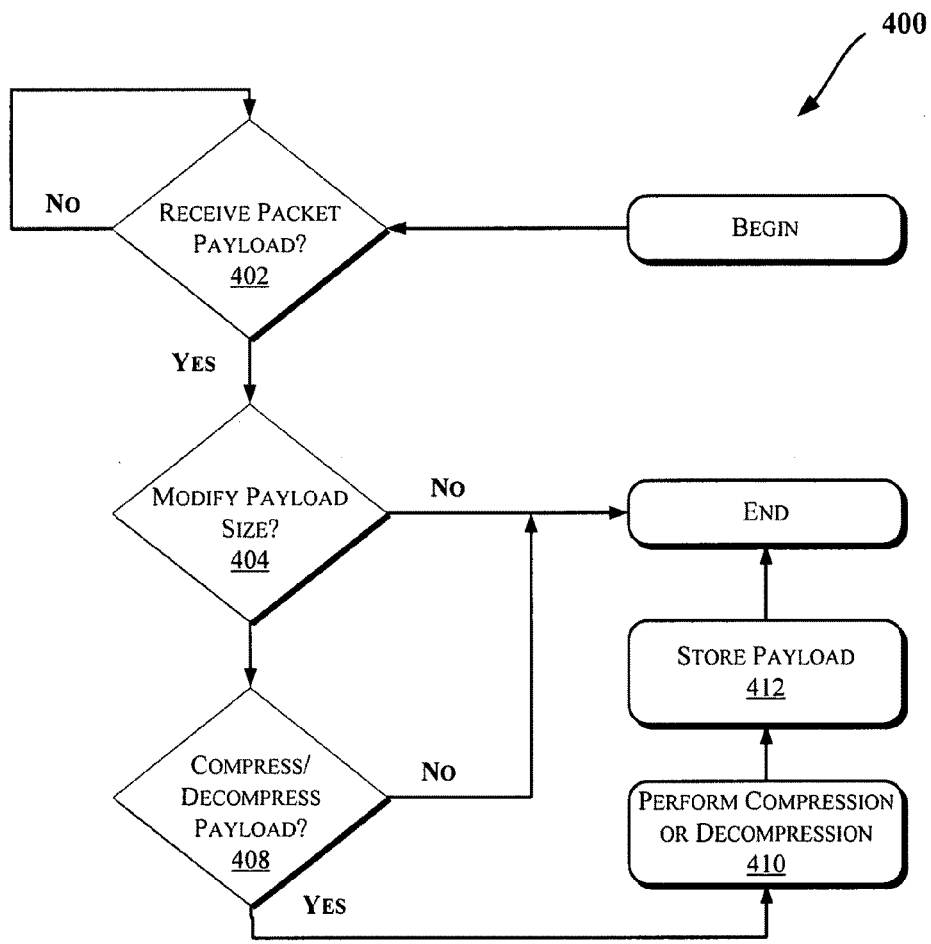
FIG. 4 illustrates a flow diagram of method according to an embodiment.

FIG. 4 illustrates a flow diagram of a method 400 to compress and/or decompress packet payloads, according to an embodiment. In some embodiments, one or more of the components discussed with reference to FIGS. 1-3 and/or 5 may be used to perform one or more of the operations of method 400.

Referring to FIGS. 1-4, at an operation 402, it may be determined whether a packet payload has been received. For example, one of the processors 202 and/or network adapter 230 may receive the packet payload at operation 402. At an operation 404, it may be determined whether the size of the received packet payload is to be modified. For example, operation 404 may determine that the received packet payload is compressed (e.g., by reference to a field within a descriptor such as the descriptor 300) and the packet payload is to be decompressed. For packet payloads that have not been compressed, operation 404 may determined whether the received packet payload is to be compressed.

In one embodiment, based on a comparison to a threshold value, operation 404 may determine that a packet payload is to be compressed or not. For example, a packet payload that is smaller than the threshold value may not be compressed, whereas packet payloads having a larger size may be compressed. Also, the type of the packet payload content may be taken into account at operation 404. For example, time-sensitive data such as streaming audio or video may not be compressed. Alternatively, non-time sensitive data such as image and/or text files may be compressed. In an embodiment, operation 404 may be performed by the network adapter 230 and/or processor 202 (or by logics contained therein).

At an operation 408, it may be determined whether the payload is to be compressed or decompressed such as discussed herein, e.g., with reference to FIGS. 2 and 3. At an operation 410, the compression/decompression is performed (e.g., in accordance with the compression type indicated in a corresponding descriptor such as discussed with reference to FIG. 3). At an operation 412, the compressed/decompressed payload is stored, such as discussed herein, e.g., with reference to FIGS. 2 and 3.

In an embodiment, when a packet arrives from the network 102, it is associated with a descriptor in (or accessible by) a NIC (e.g., network adapter 230). The descriptor contains a memory address (e.g., an address of a location in the memory 212 or caches 264 in case of a direct cache access (DCA) implementation) at which the packet is to be stored by the NIC. In addition, the NIC prepares (e.g., writes) status information within the descriptor (such as discussed with reference to FIG. 3) in order to inform the processors 202 regarding the nature and status of the packet. The NIC then transfers the packet and the descriptor using Direct Memory Access (DMA) to memory 212 or DCA to cache 264.

For example, in an outbound flow (when packets are being transmitted to the network 102), the processor 202 may read uncompressed data from the cache 264 and compresses it, writing the data into a new memory location within the memory 212. The processor may then create a descriptor, indicating that the payload is compressed and providing a pointer to the new memory location. In an embodiment, upon a write to a register associated with the NIC (e.g., network adapter 230), the NIC performs DMA transfer of the descriptor, header, and the compressed payload. The NIC may also obtain the data from cache 264 (e.g., using DCA) if the descriptor and the payload are found in the caches 264. The NIC then decompresses the payload, and creates the final packet to be sent out on the network 102.

Accordingly, in some embodiments, at least some critical data paths, e.g., involving PCI Express, system interconnects, and/or memory interconnects may be made more efficient by reducing the number of bytes moved on them. Compression permits additional bandwidth headroom for other programs and non-network data. By reducing the amount of time needed by the NIC to access main memory (by accessing fewer bytes), there is less constraint on this resource. This is further reinforced by need to support higher network bandwidths. Moreover, by using smaller payload sizes (e.g., as a result of compression), NIC-memory latency is shorter. Further, reducing the number of transactions (proportional to the number of bytes) between chips or within a chip reduces power consumed by components of systems 200 and/or 500, including for example, the NIC, chipset, processors, and main memory. Additionally, there may be no impact on system software architecture since the compression/decompression may be performed by a driver or abstracted by existing memory copy routines. In some embodiments, existing DMA and descriptor mechanisms may be leveraged to indicate whether packet payload has been compressed or not. Further, the network protocol need not be changed. Also, some embodiments operate in the presence of encryption/decryption schemes associated with security.

Figure 5:
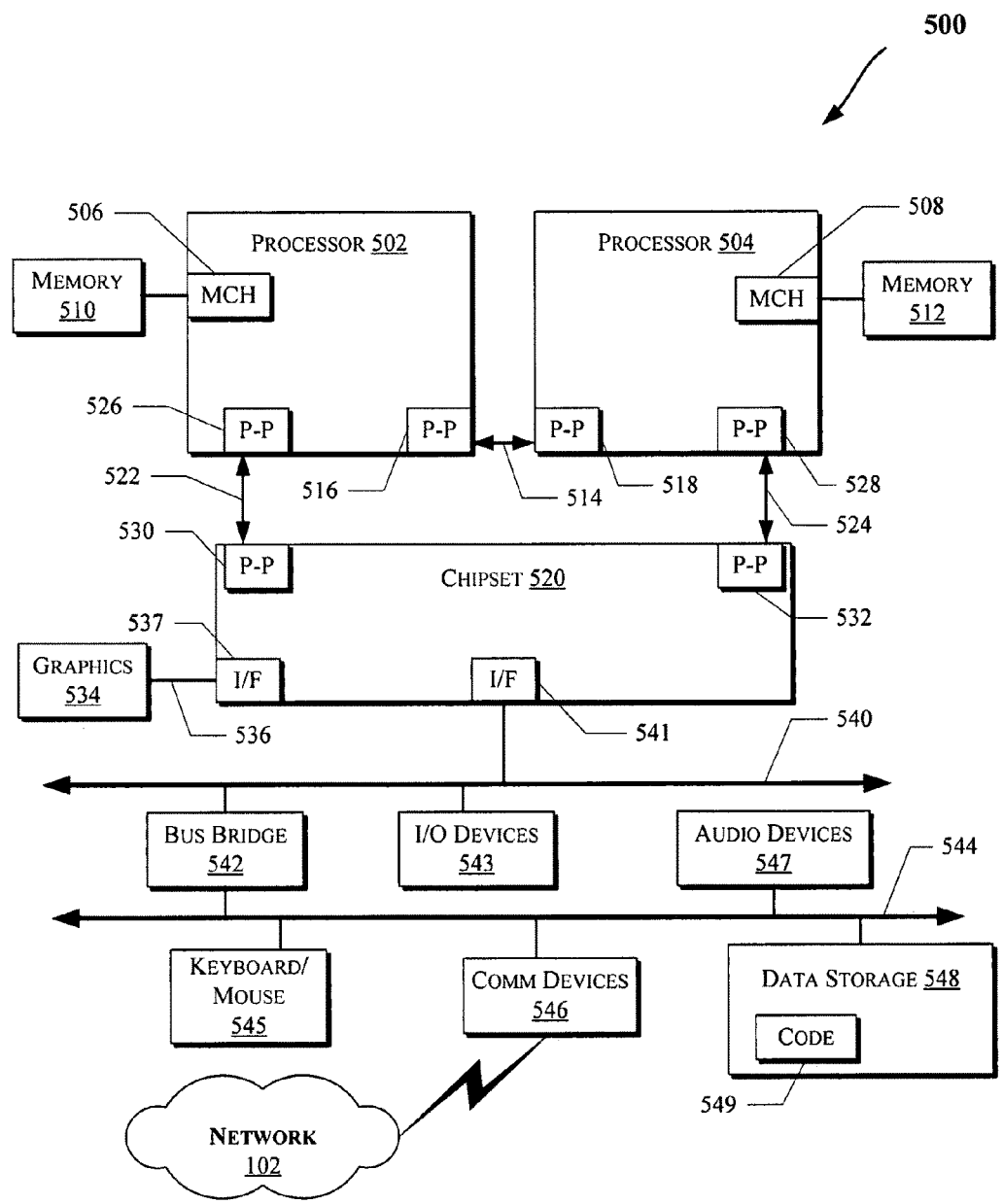

FIG. 5 illustrates a computing system 500 that is arranged in a point-to-point (PtP) configuration, according to an embodiment of the invention. In particular, FIG. 5 shows a system where processors, memory, and input/output devices are interconnected by a number of point-to-point interfaces. The operations discussed with reference to FIGS. 1-4 may be performed by one or more components of the system 500.

As illustrated in FIG. 5, the system 500 may include several processors, of which only two, processors 502 and 504 are shown for clarity. The processors 502 and 504 may each include one or more of the caches 264 and/or logic 263. The memories 510 and/or 512 may store various data such as those discussed with reference to the memory 212 of FIG. 4.

In an embodiment, the processors 502 and 504 may be one of the processors 402 discussed with reference to FIG. 4. The processors 502 and 504 may exchange data via a point-to-point (PtP) interface 514 using PtP interface circuits 516 and 518, respectively. Further, the processors 502 and 504 may include a high speed (e.g., general purpose) I/O bus channel in some embodiments of the invention to facilitate communication with various components (such as I/O device(s)). Also, the processors 502 and 504 may each exchange data with a chipset 520 via individual PtP interfaces 522 and 524 using point-to-point interface circuits 526, 528, 530, and 532. The chipset 520 may further exchange data with a graphics circuit 534 via a graphics interface 536, e.g., using a PtP interface circuit 537.

At least one embodiment of the invention may be provided within the processors 502 and 504. For example, one or more of the components discussed with reference to FIG. 2 may (such as the logic 263) be provided on the processors 502 and/or 504. Other embodiments of the invention, however, may exist in other circuits, logic units, or devices within the system 500 of FIG. 5. Furthermore, other embodiments of the invention may be distributed throughout several circuits, logic units, or devices illustrated in FIG. 5.

The chipset 520 may communicate with a bus 540 using a PtP interface circuit 541. The bus 540 may communicate with one or more devices, such as a bus bridge 542 and I/O devices 543. Via a bus 544, the bus bridge 542 may communicate with other devices such as a keyboard/mouse 545, communication devices 546 (such as modems, network interface devices, or other communication devices that may communicate with the computer network 102, including for example, the network adapter 230 of FIG. 2), audio I/O device 547, and/or a data storage device 548. The data storage device 548 may store code 549 that may be executed by the processors 502 and/or 504.

In various embodiments of the invention, the operations discussed herein, e.g., with reference to FIGS. 1-5, may be implemented as hardware (e.g., logic circuitry), software, firmware, or any combinations thereof, which may be provided as a computer program product, e.g., including a machine-readable or computer-readable medium having stored thereon instructions (or software procedures) used to program a computer (e.g., including a processor) to perform a process discussed herein. The machine-readable medium may include a storage device such as those discussed herein.

Additionally, such computer-readable media may be downloaded as a computer program product, wherein the program may be transferred from a remote computer (e.g., a server) to a requesting computer (e.g., a client) by way of data signals embodied in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A network input/output (I/O) system comprising:
 a first hardware logic to receive an uncompressed packet payload and compress the uncompressed packet payload prior to storing the compressed packet payload in a storage device; and
 a second hardware logic to decompress the stored packet payload based on one or more bits stored in a descriptor corresponding to the compressed packet payload, wherein the one or more stored bits indicate that the stored packet payload was previously compressed,
 wherein the descriptor is to comprise a compression type field to indicate a type of compression utilized by the first hardware logic to compress the uncompressed packet and the first hardware logic is to compress the uncompressed packet payload received from a cache coupled to a processor, wherein the cache comprises one or more of a level 1 (L1) cache, a level 2 (L2) cache, a mid-level cache (MLC), or a last level cache (LLC).

2. The system of claim 1, wherein the first hardware logic is a network adapter and the uncompressed packet payload is received from a computer network.

3. The system of claim 1, wherein the first hardware logic is to compress the uncompressed packet payload based on a comparison of a size of the packet payload and a threshold value.

4. The system of claim 1, wherein the first hardware logic is to compress the uncompressed packet payload based on a type of the packet payload.

5. The system of claim 1, wherein the cache comprises one or more of a shared cache or a private cache.

6. The system of claim 1, wherein the descriptor further consists of: a physical address field to indicate a physical address of the corresponding packet payload data, a payload original length field to indicate an original payload length prior to compression, one or more packet status and miscellaneous fields to indicate the status of the corresponding packet and other information, and a payload length after compression field to indicate a length of the payload after compression.

7. The system of claim 1, wherein the storage device comprises one or more of: a main memory or a cache.

8. The system of claim 7, wherein the cache comprises one or more of a shared cache or a private cache.

9. The system of claim 7, wherein the cache comprises one or more of a level 1 (L1) cache, a level 2 (L2) cache, a mid-level cache (MLC), or a last level cache (LLC).

10. A method comprising:
receiving a packet payload;
determining whether to compress or decompress the packet payload based on one or more bits in a stored descriptor associated with the packet payload;
compressing or decompressing the packet payload in response to the determining, wherein the packet payload is to be received from a cache coupled to a processor and wherein the cache comprises one or more of a level 1 (L1) cache, a level 2 (L2) cache, a mid-level cache (MLC), or a last level cache (LLC); and
storing the compressed or decompressed packet payload in a storage device.

11. The method of claim 10, wherein the compressing is performed only:
after determining that the packet payload is greater than a threshold value; or
based on a type of the packet payload.

12. The method of claim 10, further comprising receiving the packet payload from a network.

13. The method of claim 10, further comprising transmitting the decompressed packet to a network.

14. The system of claim 1, wherein the type of compression is Lempel-Ziv compression.

15. The method of claim 10, wherein the type of compression is Lempel-Ziv compression.

16. The method of claim 10, wherein the descriptor is to comprise a compression type field to indicate a type of compression utilized to compress the packet.

17. A non-transitory computer-readable medium to store one or more instructions that when executed by a processor are to:
receive an uncompressed packet payload and compress the uncompressed packet payload prior to storing the compressed packet payload in a storage device; and
decompress the stored packet payload based on one or more bits stored in a descriptor corresponding to the compressed packet payload, wherein the one or more stored bits indicate that the stored packet payload was previously compressed,
wherein the descriptor is to comprise a compression type field to indicate a type of compression utilized to compress the uncompressed packet and wherein the uncompressed packet payload is to be received from a cache coupled to the processor, wherein the cache is to comprise one or more of a level 1 (L1) cache, a level 2 (L2) cache, a mid-level cache (MLC), or a last level cache (LLC).

18. The medium of claim 17, wherein the uncompressed packet payload is to be compressed based on a comparison of a size of the packet payload and a threshold value.

19. The medium of claim 17, wherein the uncompressed packet payload is to be compressed based on a type of the packet payload.

* * * * *